United States Patent
Shan et al.

(10) Patent No.: US 7,761,455 B2
(45) Date of Patent: Jul. 20, 2010

(54) LOADING DATA FROM A VERTICAL DATABASE TABLE INTO A HORIZONTAL DATABASE TABLE

(75) Inventors: Eric Y. Shan, Saratoga, CA (US); Fabio Casati, Palo Alto, CA (US); Maria Guadalupe Castellanos, Sunnyvale, CA (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 662 days.

(21) Appl. No.: 10/814,715

(22) Filed: Mar. 31, 2004

(65) Prior Publication Data

US 2005/0223032 A1 Oct. 6, 2005

(51) Int. Cl.
*G06F 7/00* (2006.01)
(52) U.S. Cl. ........................... 707/752; 707/809
(58) Field of Classification Search ............... 707/104.1, 707/100, 10, 3
See application file for complete search history.

(56) References Cited

U.S. PATENT DOCUMENTS

| | | | | |
|---|---|---|---|---|
| 5,794,229 A | * | 8/1998 | French et al. | 707/2 |
| 5,819,286 A | * | 10/1998 | Yang et al. | 707/1 |
| 5,918,225 A | * | 6/1999 | White et al. | 707/3 |
| 6,052,121 A | * | 4/2000 | Webster et al. | 715/733 |
| 6,175,829 B1 | * | 1/2001 | Li et al. | 707/3 |
| 6,298,342 B1 | * | 10/2001 | Graefe et al. | 707/4 |
| 6,339,769 B1 | * | 1/2002 | Cochrane et al. | 707/2 |
| 6,763,350 B2 | * | 7/2004 | Agrawal et al. | 707/3 |
| 6,985,903 B2 | * | 1/2006 | Biacs | 707/100 |
| 7,260,566 B2 | * | 8/2007 | Agrawal et al. | 707/3 |
| 2002/0059283 A1 | * | 5/2002 | Shapiro et al. | 707/100 |
| 2004/0177084 A1 | * | 9/2004 | Agrawal et al. | 707/101 |

* cited by examiner

*Primary Examiner*—Hosain T Alam
*Assistant Examiner*—Leon Harper

(57) ABSTRACT

Various approaches are disclosed for loading data from a vertical database table into a horizontal database table. In one embodiment, a number of rows in a vertical database table and a number of columns in a horizontal database table are determined. Entries in a first column of the vertical table contain object identifiers, entries in a second column contain attribute names corresponding to the object identifiers, and entries in a third column contain attribute values corresponding to the attribute names. The horizontal table includes a column for the object identifiers and respective attribute columns for the attributes names. One of a plurality of methods is selected and used for reading data from the vertical database table and writing data to the horizontal database table based in part on the number of rows in the vertical database table and the number of columns in the horizontal database table.

16 Claims, 4 Drawing Sheets

202

| ID (206) | PROPERTY (208) | VALUE (210) |
|---|---|---|
| 55 | FOUR | 345 |
| 98 | ONE | 129 |
| 55 | ONE | 4847 |
| 98 | FIVE | 6770 |
| 55 | TWO | 6765 |
| 55 | THREE | 5685 |
| 56 | ONE | 2020 |
| 56 | FOUR | 9854 |
| 56 | TWO | 458 |
| 55 | FIVE | 2225 |
| 98 | THREE | 392 |
| 56 | THREE | 1375 | convert ⇒

204

| ID | ONE | TWO | THREE | FOUR | FIVE |
|---|---|---|---|---|---|
| 55 | 4847 | 6765 | 5685 | 345 | 2225 |
| 56 | 2020 | 458 | 1375 | 9854 | NULL |
| 98 | 129 | NULL | 392 | NULL | 6770 |

LOADING DATA FROM A VERTICAL DATABASE TABLE INTO A HORIZONTAL DATABASE TABLE

FIELD OF THE INVENTION

The present disclosure generally relates to loading data from a vertical database table into a horizontal database table.

BACKGROUND

Many organizations have very large databases that may contain information that is useful but not easily retrievable. Data mining is a technique that seeks to extract meaningful information from a large data set that is generally not built to accommodate easy retrieval of the desired information.

Data mining generally involves identifying data patterns and correlations between data in a given data set. Example information that data mining applications may seek include analysis of market basket purchasing patterns, seasonal purchasing patterns by customers of a large retailer, demographic relationships to airline travel patterns, and credit histories. The patterns discovered through data mining may be used to improve an organization's effectiveness or profitability. Thus, there is a growing demand for tools that provide data mining capabilities.

Data mining often involves first preparing the data for analysis. The necessary preparation depends on the sources of data to be analyzed and on the tool used for analysis. Oftentimes the data to be analyzed may be under management of different database management systems provided by different vendors. This data must be coalesced into a data set compatible with the data mining tool. While each data preparation problem has its own peculiarities, a common need exists for horizontalizing one or more vertical database tables.

The term vertical database table is often used to refer to a table that has at least three columns. The data in one of the columns includes the identifiers of the objects being described, for example, a customer or process identifier. The data in a second column identifies properties or attributes of an object, for example, marital status, age, and income. A third column contains the values of the properties or attributes. An example triplet having the three data items is, <34972225, age, 33>.

Flexibility is an advantage of a vertical database table. There is no need to know in advance the kind of properties that will be associated with an object. When a new property is defined and an associated value is known for a certain object, the triplet, <object identifier, property identifier, value>, may be stored in the vertical database table. Vertical database tables are also useful in describing, in a single structure, the properties of objects of different types, such as where different objects have different properties (not just different property values). Vertical tables generally support fast writing of data, such as may be required in logging program activities.

Horizontalization of a vertical database table involves loading data from a vertical database table into a horizontal database table. A horizontal database table has one row for each object identifier instead of the many rows per object identifier that may be found in a vertical table. A horizontal table has a column for the object identifiers, and a column for each property of an object. The data values within a property column indicate the property values for the objects represented by the rows. Horizontal tables are beneficial to data mining tools, which are generally retrieval oriented. Indeed, most data mining tools expect data to be prepared in such a horizontal format for ease of analysis of all the properties of an object. The horizontal table also supports analysis of the data to determine correlations between properties. In order to arrive at statistically significant results, the source data sets are generally very large. That is, there may be a very large quantity of data that is stored in vertical tables.

SUMMARY

Various embodiments of the invention are disclosed for loading data from a vertical database table into a horizontal database table. In one embodiment, a number of rows in a vertical database table and a number of columns in a horizontal database table are determined. Entries in a first column of the vertical table contain object identifiers, entries in a second column contain attribute names corresponding to the object identifiers, and entries in a third column contain attribute values corresponding to the attribute names. The horizontal table includes a column for the object identifiers and respective attribute columns for the attributes names. One of a plurality of methods is selected and used for reading data from the vertical database table and writing data to the horizontal database table based in part on the number of rows in the vertical database table and the number of columns in the horizontal database table.

It will be appreciated that various other embodiments are set forth in the Detailed Description and Claims which follow.

DETAILED DESCRIPTION

Figure 1:
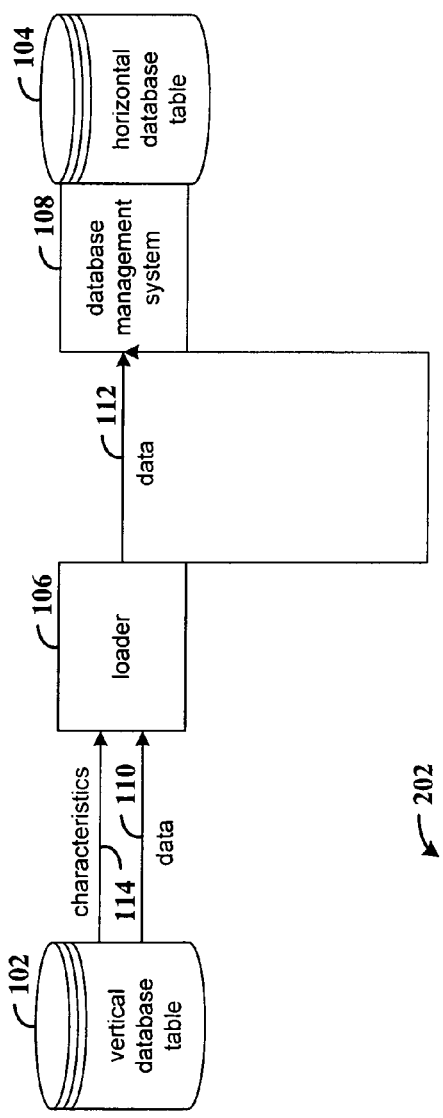
FIG. 1 is a block diagram that illustrates loading data from a vertical database table into a horizontal database table in accordance with various embodiments of the invention.

FIG. 1 is a block diagram that illustrates loading data from a vertical database table 102 into a horizontal database table 104 accordance with various embodiments of the invention. The loader 106 directs the conversion process. Data is read (line 110) by the loader from the vertical table, and the loader 106 builds a horizontal table using the services provided by the database management system 108 and writes the data (line 112) to the horizontal table 104. Various characteristics (line 114) of the vertical table are used by the loader 106 both in determining the content of the horizontal table and in selecting an efficient approach for loading the data in the vertical database table to the horizontal table 104. In addition, characteristics of the resulting horizontal table are used in selecting an efficient approach.

The structure and access interfaces for vertical database table 102 and horizontal database table 104 may vary according to implementation requirements. For example, the vertical database table may be a simple structured file that is accessible via normal file system calls or be a file that is accessible via a database management system. The horizontal database table may be made and managed under a relational database management system, for example, Oracle 8i. Those skilled in the art will appreciate that numerous alternative file management systems and database management systems may be adapted or used in conjunction with the embodiments of the present invention.

In one embodiment, different approaches are used to store the data from the vertical table in the horizontal table depending on the number of rows in the vertical table and the number of columns in the horizontal table. The different approaches are generally referred to as the pure SQL approach, the SQL loader approach, and the iterative insert approach. Each of the different approaches may be more advantageous (in terms of total conversion time) when the loader is dealing with different numbers of columns in the horizontal table and numbers of rows in the vertical table. In still further embodiments, an approximation of the percentage of null values that will be in the resulting table is used in selecting one of the aforementioned approaches.

Figure 2:
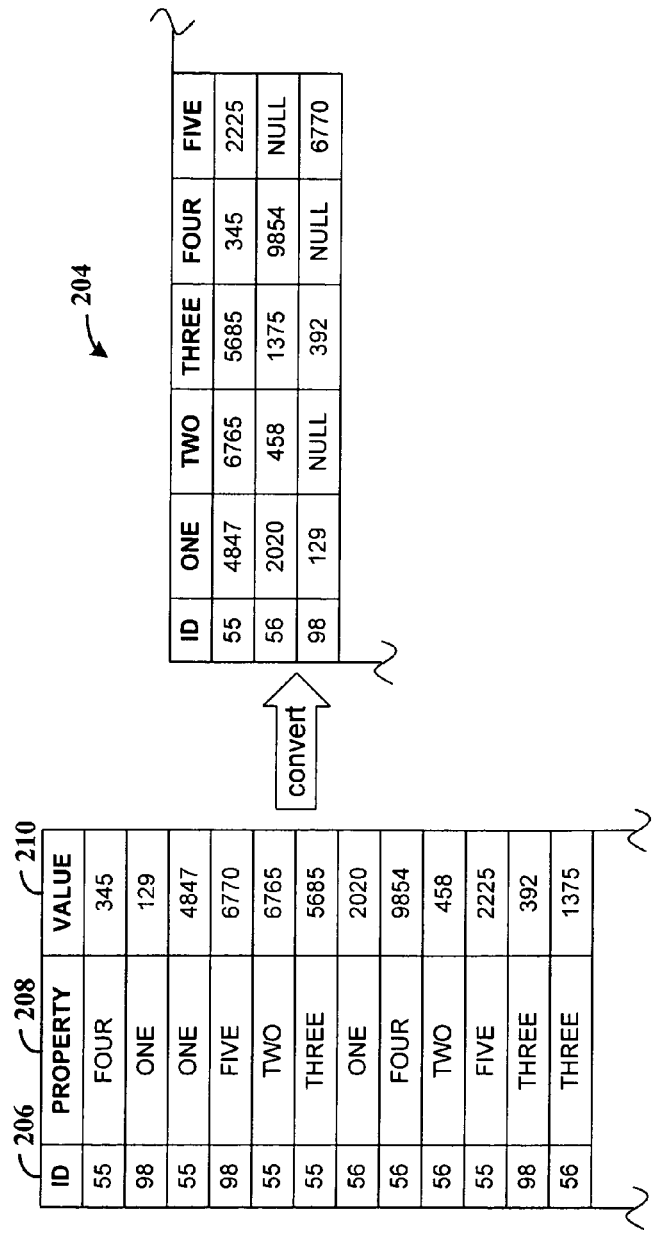
FIG. 2 illustrates an example of a vertical database table that has been loaded to a horizontal database table.

FIG. 2 illustrates an example of a vertical database table 202 that has been loaded to a horizontal database table 204. The example vertical table 202 has three columns, including column 206 for the object identifier, column 208 for the property name, and column 210 for the property value. Each row within the example vertical table 202 contains the tuple, <identifier, property, value>. For example, the object having the ID 55 has property names FOUR, ONE, TWO, THREE, and FIVE and corresponding values 345, 4847, 6765, 5685, and 2225.

In an example embodiment, only rows in which the combinations of entries in the ID and property columns 206 and 208 are considered. If there are two or more rows in which the ID and property columns have the same pair of values, these rows are discarded. This means that the data in the row is not loaded into the horizontal table. If there are more than three columns in the vertical table, the columns other than the ID, PROPERTY, and VALUE are ignored.

Each unique ID value in the vertical table 202 is used in constructing a row in the horizontal table, and each unique property name in the PROPERTY 208 of the vertical table is used as a column name in the horizontal table. Thus, the three unique IDs in the vertical table form the three rows in the horizontal table. The columns named, ONE, TWO, THREE, FOUR, and FIVE in the horizontal table 204 are the names from the PROPERTY column 208 in the vertical table. There is a respective property name column in the horizontal table for each unique property name appearing in the property column 208.

The values from the VALUE column 210 of the vertical table 202 are stored in the appropriate entries in the horizontal table 204. For example, the value 345 is stored in the entry at row for ID 55, column FOUR.

The objects in the vertical table 202 need not have identical sets of properties. For example, the objects with IDs 55 and 56 both have the property, TWO, and the object with ID 98 does not. When an object in the vertical table does not have a row with a property that is in the resulting horizontal table 204, a NULL value is stored in the entry in the horizontal table. The entry at the row of object ID 98 and the TWO column illustrates a NULL value. The NULL value indicates that the value is undefined for the associated property, and any application-suitable value may be used as the NULL value.

Figure 3:
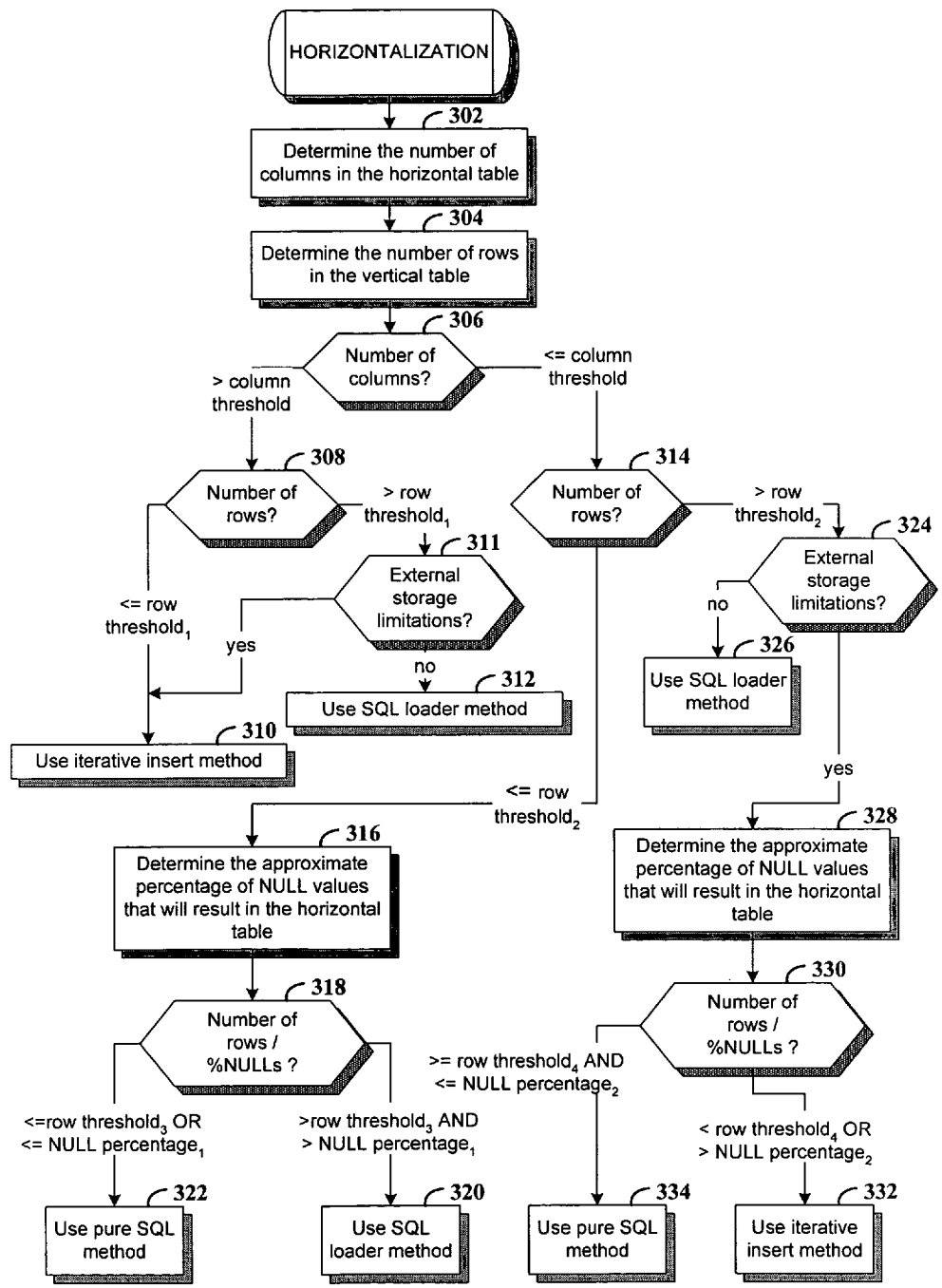
FIG. 3 is a flowchart of an example process for loading data from a vertical database table into a horizontal database table in accordance with various embodiments of the invention.

FIG. 3 is a flowchart of an example process for loading data from a vertical database table into a horizontal database table in accordance with various embodiments of the invention. In the example embodiments there are three approaches for loading the data into the horizontal table. Of the three approaches one is selected based on the number of rows in the vertical table, the number of columns in the horizontal table, and the approximate percentage of NULL values that will result in the horizontal table. As referred to above, the three approaches are referred to as the iterative insert approach, the SQL loader approach, and the pure SQL approach.

The number of columns in the horizontal table may be determined by analyzing the data in the vertical table (step 302). The number of columns in the horizontal table depends on the number of different properties that are in the vertical table. The vertical table may contain information for a number of different properties (e.g., age, telephone number, eye color, salary) for different objects. In the process of horizontalizing, one thing to be done is to count all the different properties. The number needs to be determined before moving the data from the vertical table to the horizontal table.

In one embodiment the vertical table is scanned to determine the number of distinct property names. The number of columns in the horizontal table is then the number of distinct property names plus one column for the object identifier. In another embodiment the user may specify the properties of interest, and the horizontalization process may select from the vertical table the data associated with those properties of interest for storage in the horizontal table. The number of columns in the horizontal table includes the user-specified properties plus a column for the object identifier.

At step 304 the number of rows in the vertical database table is determined. If the vertical database table is accessed through a database management system, a command such as "SELECT COUNT(*) FROM VERTICAL_TABLE" returns the number of rows. In another embodiment, the number of rows may be maintained in a file header for a file accessed directly via a file management system.

A first decision is made at step 306 in support of selecting an approach for loading data from the vertical table into the horizontal table. This decision checks the number of columns in the horizontal table. If the number of columns in the horizontal table is greater than a selected threshold then the process proceeds to step 308, otherwise the process proceeds to step 314.

In one embodiment the value of the column threshold is 100 columns. It will be appreciated that other implementations may find values other than 100 to be suitable for use as the threshold. By running the horizontalization process using different values for the various thresholds (i.e., the thresholds used for the number of rows in the vertical table and the thresholds used for the expected percentage of NULL, values in the resulting horizontal table) and tracking the time required to horizontalize the data, over time a set of threshold values may be tailored for a particular application. Therefore, other implementations may, for each of the thresholds, use a threshold values that is greater than or less than the example threshold value stated herein.

A second decision is made at step 308 based on the number of rows in the vertical table. At step 308 if the number of rows is less than or equal to a first row threshold (row threshold$_1$), the iterative insert method is used (step 310) to load the data from the vertical table into the horizontal table (see FIG. 5). If the number of rows in the vertical table is greater than the first row threshold, then the process proceeds to decision step 311 to check whether there are external storage limitations. "External" refers to retentive storage space, such as disk space. As is discussed in more detail below, the SQL loader method creates an intermediate file. If there is insufficient storage for the entire intermediate file, the SQL loader approach is not used. The size of the intermediate file may be determined from the sizes of character strings needed to represent the different types of property values and the number of each different type of property value. Thus, if there are no external storage limitations, decision step 311 directs the process to step 312, where the SQL loader approach is used to load the horizontal table. If there are storage limitations, the process is directed to step 310 where the iterative insert method is used.

At decision step 314 the number of rows in the vertical table is compared to a second row threshold (row threshold$_2$). In one embodiment, an example second row threshold is 5000 rows in the vertical database table. If the number of rows is less than or equal to the second row threshold, the process proceeds to determine an approximate percentage of NULL values that the horizontal table will contain (step 316). In one embodiment the ratio of the number of property values in the vertical table to the number of property values in the horizontal table is used to estimate the percentage of NULLs that will be in the resulting horizontal database table. For example, the number of property values in the horizontal table is the product of the number of object identifiers (rows) and the number of properties (# of columns−1 to exclude the object identifier column). The number of property values in the vertical table is the number of rows in the vertical table. The fraction of NULL property values in the horizontal table is one minus the ratio of the number of property values in the vertical table to the number of property values in the horizontal table (1−ratio). This fraction multiplied by 100% is the approximate percentage of NULL values that the horizontal table will contain.

In another embodiment, the approximate percentage of null values may be determined from catalog/histogram statistics for the vertical table. Some database management systems may be configured to periodically analyze tables and derive values such as the approximate percentage of null values, and store this information in a system table. This value may be read from the system table to find the approximate percentage of NULL values. This system-provided NULL percentage frees the horizontalization process from computing the value. However, whether the system-provided value may not be current.

The approximate percentage of NULL values and the number of rows in the horizontal table are then used to select either the pure SQL approach or the SQL loader approach for loading the horizontal table (decision step 318). If the number of rows is greater than a third row threshold (row thresholds) AND the approximate percentage of NULL values is greater than a selected first NULL percentage threshold (NULL percentage$_1$), then the SQL loader approach is used to load the horizontal table (step 320). Otherwise, either the number of rows is less than or equal to the third row threshold, OR the approximate percentage is less than or equal to the first NULL percentage threshold, and the pure SQL approach is used (step 322). In an example embodiment, the third row threshold is 3000 rows in vertical database table, and the first NULL percentage threshold is 75%.

Returning now to decision step 314, if the number of rows in the vertical table is greater than the second row threshold, then the process proceeds to decision step 326 to check whether there are external storage limitations. If there are no external storage limitations, decision step 324 directs the process to step 326, where the SQL loader approach is used to load the horizontal table. If there are storage limitations, the process is directed to step 328.

Step 328 determines, as described above, an approximate percentage of NULL values that will occupy the resulting horizontal table. Decision step 330 uses the number of rows and the approximate percentage to select either the iterative insert approach (step 332) or the pure SQL approach (step 334). If the number of rows is less than a selected fourth row threshold (row threshold$_4$), OR the approximate NULL percentage is greater than a second selected NULL percentage threshold (NULL percentage$_2$), then the iterative insert approach is used to load the horizontal database table (step 332). Otherwise, the number of rows is greater than or equal to the fourth row threshold, AND the approximate NULL percentage is less than or equal to the second NULL percentage threshold, and the pure SQL approach is used (step 334).

Figure 4:
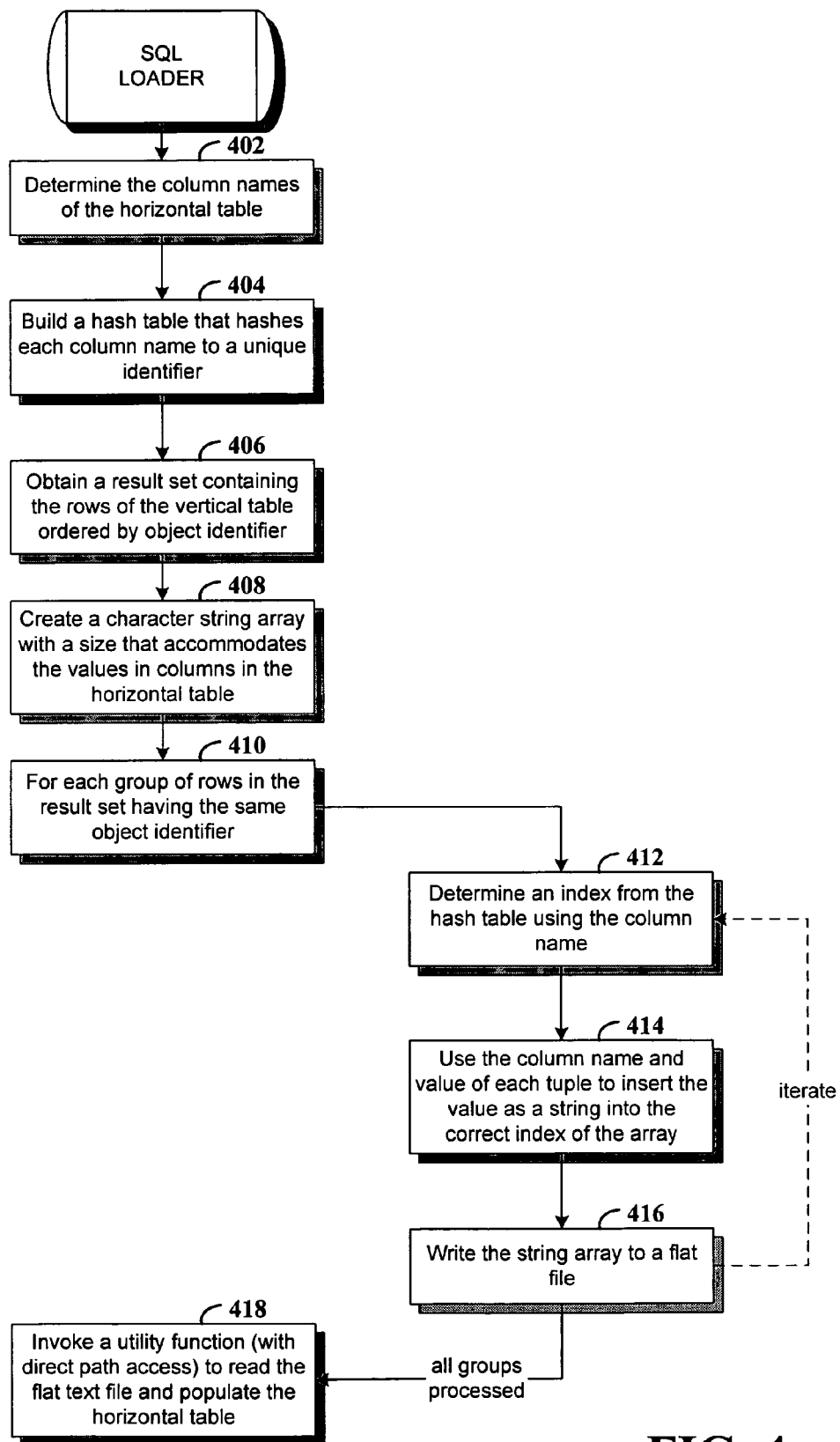
FIG. 4 is a flowchart of an example process for implementing an SQL loader approach in accordance with various embodiments of the invention.

FIG. 4 is a flowchart of an example process for implementing the SQL loader approach in accordance with various embodiments of the invention. The SQL loader approach generally reads data from the vertical table and writes the data to a flat file. The data is then loaded from the text file into the horizontal table.

At step 402 the column names of the horizontal table are determined. In one embodiment, property names are collected as data is written to the vertical database table. These collected property names may then be used to create the horizontal database table with associated columns (also in step 402). In another embodiment, the vertical database table may be scanned to determine the property names. It will be appreciated that the horizontal database table may be created once the desired property names and data types of the properties are known. The column names of the horizontal database table may be determined using an SQL command, such as, SELECT*FROM HORIZONTAL TABLE.

The SQL loader approach then builds a hash table (step 404). A hash function applied to the column name yields a unique identifier (i.e., hash(column_name)=unique identifier). The unique identifier is used to look up in the hash table an index value which is associated (by way of the hash) with the column name. The index value references the starting position in the character string array, which is used in writing a value of a column name (steps 412, 414)

At step 406, a result set is obtained from the vertical table. The result set includes the data in rows of the vertical database table and is ordered by object identifier. If the vertical database table is accessible via SQL queries, the result set may be obtained by the command, SELECT*FROM VERTICAL-TABLE ORDER BY ID. The ordered result set from the example vertical table 202 of FIG. 2 is:

| | | |
|---|---|---|
| 55 | FOUR | 345 |
| 55 | ONE | 4847 |
| 55 | TWO | 6765 |
| 55 | THREE | 5685 |
| 55 | FIVE | 2225 |
| 56 | ONE | 2020 |
| 56 | FOUR | 9854 |
| 56 | TWO | 458 |
| 56 | THREE | 1375 |
| 98 | ONE | 129 |
| 98 | FIVE | 6770 |
| 98 | THREE | 392 |

A character string array is created for use in forming a tuple that is eventually inserted in the horizontal database table (step 408). The string array is sized to accommodate the maximum sizes of the values for the different columns. For example, some columns may require only a single digit and others may require five digits. In the current example, it is assumed that the ID requires 3 digits and the property name columns require no more than four digits. Thus, the ID and five property names illustrated in horizontal database 204 table in FIG. 2 would require 23 characters (3+5*4=23).

Steps 412, 414, and 416 are performed for each group of rows in the results set having the same identifier. For example, one of the groups includes:

| 55 | FOUR  | 345  |
|----|-------|------|
| 55 | ONE   | 4847 |
| 55 | TWO   | 6765 |
| 55 | THREE | 5685 |
| 55 | FIVE  | 2225 |

Steps 412 and 414 are further performed for each row in the group. At step 412, the hash function is applied to the property name in the row to determine the appropriate index into the string array, and the string value is written to the string array at the appropriate index (step 414). For example, if the row in process is: 55 FOUR 345, then the property name to hash is "FOUR." Assuming the order of columns shown in table 204 of FIG. 2, the property name FOUR hashes to position 16 in the string array (assuming the string array is indexed 1 ... 23). The string "345" is then stored in the string array beginning at index 16. Once steps 412 and 414 are performed on all rows in the group, the resulting string array is written to a flat text file (step 416). A flat file is generally understood to be a file containing only characters such as ASCI text and no meta-characters or meta-data. In the example group above for the object identifier 55, the contents of the final string array are:
0554847676556850345225

It will be appreciated that values may be padded with leading "0"s as needed. The string array may then be reused for the next object-identifier group. It will be appreciated that an application-specific value may be chosen and used if a NULL value is to be written to the string array. For example, if the row, 55 FIVE 2225 was not present in the vertical database table, a set of characters such as "****" could be written to the string array to represent the NULL value.

Once all the groups of object identifiers have been processed, a utility function may be invoked to read the flat text file and populate the horizontal table with the data (step 418). Such utility functions are generally provided with database management systems. Utilities of this type are generally optimized to handle loading of flat file data into a relational database structure.

Figure 5:
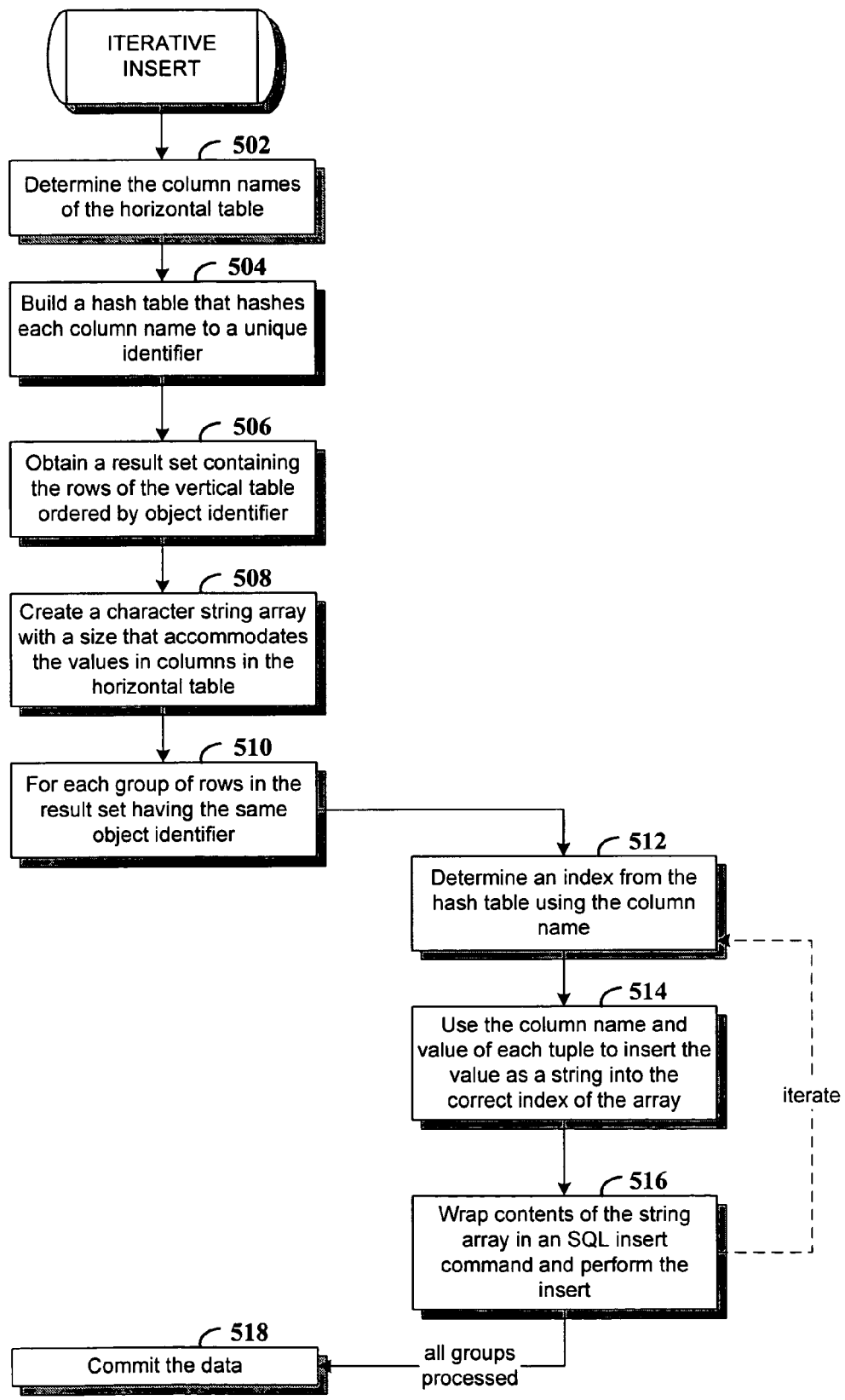
FIG. 5 is a flowchart of an example process for loading data into a horizontal database table by way of iteratively issuing an insert command in accordance with various embodiments of the invention.

FIG. 5 is a flowchart of an example process for loading data into a horizontal database table by way of iteratively issuing an insert command in accordance with various embodiments of the invention. Steps 502, 504, 506, 508, 510, 512, and 514 of the iterative insert process are performed in the manner described for corresponding steps 402, 402, 404, 406, 408, 410, 412, and 414 of the SQL loader process of FIG. 4.

The iterative insert process differs from the SQL loader process at step 516, where the contents of the string array are wrapped in an SQL insert command. The resulting insert command is then issued to the database management system of the horizontal database table. The specific syntax of the SQL command may vary from system to system. However, an example command (assuming a 23 character string array, indexed 1 . . . 23) is of the form, INSERT INTO HORIZ-TABLE (ID, ONE, TWO, THREE, FOUR, FIVE) VALUES ARRAY[1], ARRAY[4], ARRAY[8], ARRAY[12], ARRAY [16], ARRAY[20].

Once all the groups of object identifiers have been processed, the data newly added to the horizontal database table may be committed with a COMMIT command. COMMIT commands generally writes data from system memory to retentive storage (e.g., magnetic disk).

The pure SQL approach involves performing both the operations of reading data from the vertical database table and loading the data into the horizontal database table in a single SQL command. In an example implementation using Oracle 8i, the command involves grouping by IDs (the primary key in the horizontal database table) and using the aggregate SUM function with CASE statements to sort the values that match the relevant columns. An SQL statement used with the example vertical and horizontal database tables 202 and 204 of FIG. 1 is:

INSERT INTO HORIZONTALTABLE (ID, ONE, TWO, THREE, FOUR, FIVE)
    SELECT ID, SUM(CASE WHEN COLNAME='ONE' THEN VALUE ELSE NULL END) ONE,
    SUM(CASE WHEN COLNAME='TWO' THEN VALUE ELSE NULL END) TWO,
    SUM(CASE WHEN COLNAME='THREE' THEN VALUE ELSE NULL END) THREE,
    SUM(CASE WHEN COLNAME='FOUR' THEN VALUE ELSE NULL END) FOUR,
    SUM(CASE WHEN COLNAME='FIVE' THEN VALUE ELSE NULL END) FIVE,
    FROM VERTICALTABLE GROUP BY ID;

This aggregate INSERT statement may be constructed by obtaining the column names from the metadata of the horizontal database table.

Those skilled in the art will appreciate that various alternative computing arrangements would be suitable for hosting the processes of the different embodiments of the present invention. For example, the processes may be implemented on single processor, multi-processor, parallel processor, or an arrangement of processors on a local area network. In addition, the processes may be provided via a variety of computer-readable media or delivery channels such as magnetic or optical disks or tapes, electronic storage devices, or as application services over a network.

The present invention is believed to be applicable to a variety of data mining processes and has been found to be particularly applicable and beneficial in loading data from a vertical database table into a horizontal database table. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for loading data from a vertical database table into a horizontal database table, comprising:

determining a number of rows in a vertical database table and a number of columns in a horizontal database table, wherein the vertical table includes at least three columns, with entries in a first column containing object identifiers, entries in a second column containing attribute names corresponding to the object identifiers, and entries in a third column containing attribute values corresponding to the attribute names, and the horizontal table includes a column for the object identifiers and attribute columns for the attributes names;

selecting one of a plurality of methods for reading data from the vertical database table and writing data to the horizontal database table based in part on the number of rows in the vertical database table and the number of columns in the horizontal database table; and reading object identifiers and values of attributes from the vertical database table and writing the object identifiers and the values of attributes to the vertical database table using the selected one of the plurality of methods, wherein access to the horizontal database table is provided by a database management system, the method further comprising:

in response to selection of a first one of the plurality of methods, for each object identifier in the file, generating a character string array having in character string format, data from the vertical database table including, an object identifier and attribute values for attributes associated with the object identifier; and writing data from the character string array to a flat text file; and loading data from the flat text file into the horizontal database using a utility function of the database management system, wherein the utility function is adapted to read data from a flat text file.

2. The method of claim 1, wherein generating a character string array includes determining a position for storage of an attribute value in the character string array using a hash of the attribute name associated with the attribute value.

3. The method of claim 1, wherein the first one of the plurality of methods is selected in response to the number of rows in the vertical table being greater than a first threshold and the number of columns in the horizontal table being less than a second threshold.

4. A processor-implemented method for loading data from a vertical database table into a horizontal database table, comprising:

determining a number of rows in a vertical database table and a number of columns in a horizontal database table, wherein the vertical table includes at least three columns, with entries in a first column containing object identifiers, entries in a second column containing attribute names corresponding to the object identifiers, and entries in a third column containing attribute values corresponding to the attribute names, and the horizontal table includes a column for the object identifiers and attribute columns for the attributes names;

selecting one of a plurality of methods for reading data from the vertical database table and writing data to the horizontal database table-based in part on the number of rows in the vertical database table and the number of columns in the horizontal database table; and reading object identifiers and values of attributes from the vertical database table and writing the object identifiers and the values of attributes to the vertical database table using the selected one of the plurality of methods, wherein access to the horizontal database table is provided by a database management system, the method further comprising:

in response to selection of a first one of the plurality of methods, for each object identifier in the file, generating a character string array having in character string format, data from the vertical database table including, an object identifier and attribute values for attributes associated with the object identifier;

generating an SOL insert command from the contents of the character string array;

issuing the SOL insert command to the database management system; and issuing an SOL commit command to the database management system.

5. The method of claim 4, wherein generating a character string array includes determining a position for storage of an attribute value in the character string array using a hash of the attribute name associated with the attribute value.

6. The method of claim 4, wherein the first one of the plurality of methods is selected in response to the number of rows in the vertical table being less than a first threshold and the number of columns in the horizontal table being less than a second threshold.

7. An apparatus for loading data from a vertical database table into a horizontal database table, comprising:

means for determining a number of rows in a vertical database table and a number of columns in a horizontal database table, wherein the vertical table includes at least three columns, with entries in a first column containing object identifiers, entries in a second column containing attribute names corresponding to the object identifiers, and entries in a third column containing attribute values corresponding to the attribute names, and the horizontal table includes a column for the object identifiers and respective attribute columns for the attributes names;

means, responsive to the number of rows in the vertical database table and the number of columns in the horizontal database table, for selecting one of a plurality of approaches for reading data from the vertical database table and writing data to the horizontal database table; and means for performing the selected one of the plurality of approaches.

8. The apparatus of claim 7, further comprising:

a database management system coupled to the horizontal database table;

means, responsive to a selection of a first one of the plurality of approaches, for generating, for each object identifier in the file, a character string array having in character string format, data from the vertical database table including, an object identifier and attribute values for attributes associated with the object identifier; and means, responsive to selection of a first one of the plurality of approaches, for writing, for each object identifier in the file, data from the character string array to a flat text file; and means, responsive to selection of a first one of the plurality of approaches, for loading data from the flat text file into the horizontal database using a utility function of the database management system, wherein the utility function is adapted to read data from a flat text file.

9. The apparatus of claim 7, further comprising:

a database management system coupled to the horizontal database table;

means, responsive to selection of a first one of the plurality of approaches, for generating, for each object identifier in the file, a character string array having in character string format, data from the vertical database table including, an object identifier and attribute values for attributes associated with the object identifier;

means for generating an SOL insert command from the contents of the character string array;

means for issuing the SOL insert command to the database management system; and means for issuing an SOL commit command to the database management system.

10. The apparatus of claim 7, further comprising:

a database management system coupled to the vertical database table and to the horizontal database table;

means, responsive to selection of a first one of the plurality of approaches, for generating a single SQL command that selects data from the vertical table and inserts the data in the horizontal table for each object identifier in the vertical table and each column in the horizontal table; and means for issuing the SQL command to the database management system.

11. A program storage medium, comprising:

at least one processor-readable program storage device configured with instructions for loading data from a vertical database table into a horizontal database table, wherein execution of the instructions by one or more processors causes the one or more processors to perform the operations including, determining a number of rows in a vertical database table and a number of columns in a horizontal database table, wherein the vertical table includes at least three columns, with entries in a first column containing object identifiers, entries in a second column containing attribute names corresponding to the object identifiers, and entries in a third column containing attribute values corresponding to the attribute names, and the horizontal table includes a column for the object identifiers and respective attribute columns for the attributes names;

selecting one of a plurality of methods for reading data from the vertical database table and writing data to the horizontal database table based on the number of rows in the vertical database table and the number of columns in the horizontal database table; and reading object identifiers and attributes values from the vertical database table and writing the object identifiers and attributes values to the vertical database table using the selected one of the plurality of methods, wherein access to the horizontal database table is provided by a database management system, and the at least one processor-readable program storage device is further configured with instructions for execution by the one or more processors for performing the operations comprising:

in response to selection of a first one of the plurality of methods, for each object identifier in the file, generating a character string array having in character string format, data from the vertical database table including, an object identifier and attribute values for attributes associated with the object identifier; and writing data from the character string array to a flat text file; and loading data from the flat text file into the horizontal database using a utility function of the database management system, wherein the utility function is adapted to read data from a flat text file.

12. The program storage medium of claim 11, wherein the instructions for generating a character string array include instructions for determining a position for storage of an attribute value in the character string array using a hash of the attribute name associated with the attribute value.

13. The program storage medium of claim 11, wherein the first one of the plurality of methods is selected in response to the number of rows in the vertical table being greater than a first threshold and the number of columns in the horizontal table being less than a second threshold.

14. A program storage medium, comprising:

at least one processor-readable program storage device configured with instructions for loading data from a vertical database table into a horizontal database table, wherein execution of the instructions by one or more processors causes the one or more processors to perform the operations including, determining a number of rows in a vertical database table and a number of columns in a horizontal database table, wherein the vertical table includes at least three columns, with entries in a first column containing object identifiers, entries in a second column containing attribute names corresponding to the object identifiers, and entries in a third column containing attribute values corresponding to the attribute names, and the horizontal table includes a column for the object identifiers and respective attribute columns for the attributes names;

selecting one of a plurality of methods for reading data from the vertical database table and writing data to the horizontal database table based on the number of rows in the vertical database table and the number of columns in the horizontal database table; and reading object identifiers and attributes values from the vertical database table and writing the object identifiers and attributes values to the vertical database table using the selected one of the plurality of methods, wherein access to the horizontal database table is provided by a database management system, and the at least one processor-readable program storage device is further configured with instructions for execution by the one or more processors for performing the operations comprising:

in response to selection of a first one of the plurality of methods, for each object identifier in the file, generating a character string array having in character string format, data from the vertical database table including, an object identifier and attribute values for attributes associated with the object identifier;

generating an SQL insert command from the contents of the character string array;

issuing the SQL insert command to the database management system; and issuing an SQL commit command to the database management system.

15. The program storage medium of claim 14, wherein the instructions for generating a character string array include instructions for determining a position for storage of an attribute value in the character string array using a hash of the attribute name associated with the attribute value.

16. The program storage medium of claim 14, wherein the first one of the plurality of methods is selected in response to the number of rows in the vertical table being less than a first threshold and the number of columns in the horizontal table being less than a second threshold.

* * * * *

UNITED STATES PATENT AND TRADEMARK OFFICE
CERTIFICATE OF CORRECTION

PATENT NO. : 7,761,455 B2 Page 1 of 1
APPLICATION NO. : 10/814715
DATED : July 20, 2010
INVENTOR(S) : Eric Y. Shan et al.

It is certified that error appears in the above-identified patent and that said Letters Patent is hereby corrected as shown below:

In column 12, line 45, in Claim 14, delete "SOL" and insert -- SQL --, therefor.

In column 12, line 47, in Claim 14, delete "SOL" and insert -- SQL --, therefor.

Signed and Sealed this

Ninth Day of November, 2010

David J. Kappos
*Director of the United States Patent and Trademark Office*